F. S. BISSELL.

Grate.

No. 6,407.

Reissued May 4, 1875.

Witnesses.
James E. Kay
R. Q. Shinshaw

Inventor.
Frank S. Bissell
by Bakewell & Kerr
Attys.

THE GRAPHIC CO. PHOTO.-LITH. 39 & 41 PARK PLACE, N.Y.

UNITED STATES PATENT OFFICE.

FRANK S. BISSELL, OF PITTSBURG, PENNSYLVANIA.

IMPROVEMENT IN GRATES.

Specification forming part of Letters Patent No. 155,283, dated September 22, 1874; reissue No. 6,407, dated May 4, 1875; application filed April 17, 1875.

*To all whom it may concern:*

Be it known that I, FRANK S. BISSELL, of Pittsburg, in the county of Allegheny and State of Pennsylvania, have invented a new and useful Improvement in Grates; and I do hereby declare the following to be a full, clear, and exact description thereof, reference being had to the accompanying drawings, forming a part of this specification, in which—

Figure 1:
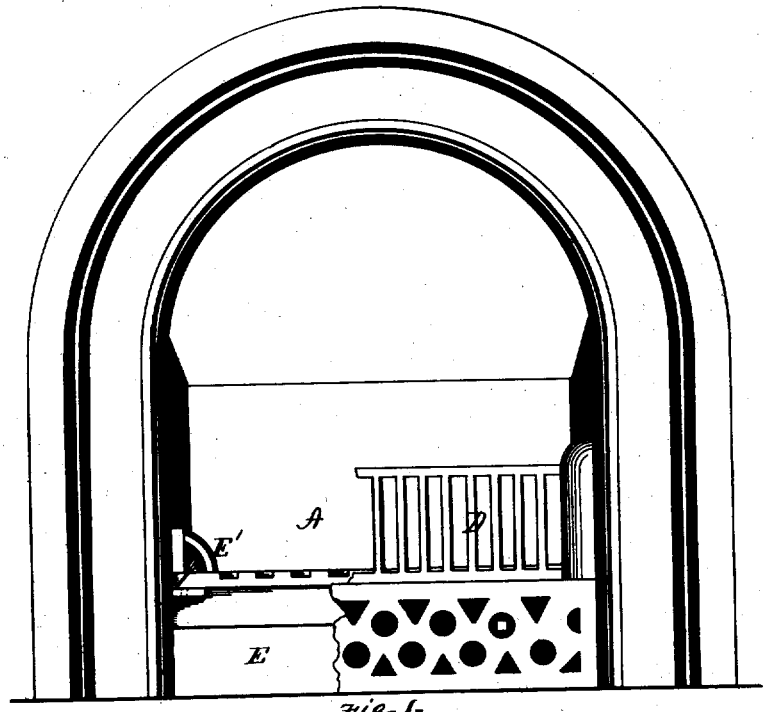
Figure 4:
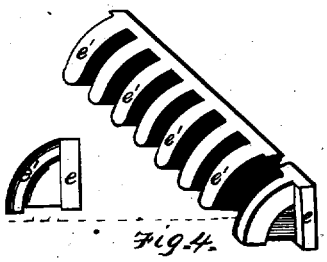
Figure 3:
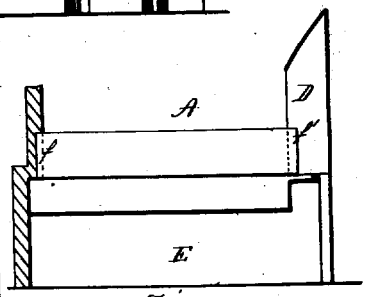
Figure 2:
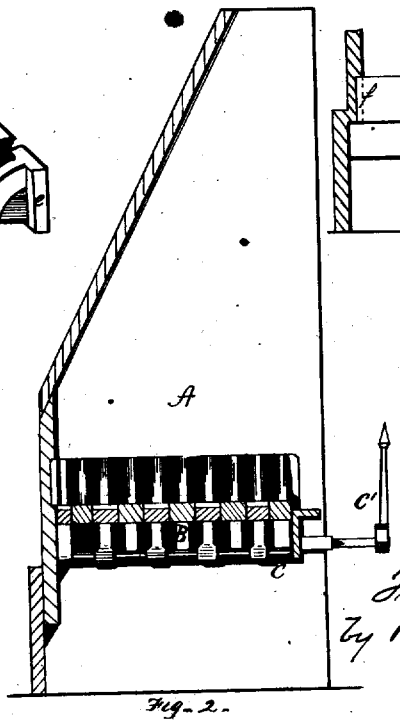

Figure 1 is a front view of a grate embodying my invention. Fig. 2 is a vertical transverse section. Fig. 3 is a similar section, the covering-bar being removed to show one mode of securing the bar; and Fig. 4 is a view of the covering-bar.

Like letters refer to like parts in the several figures.

My invention relates to that class of grates wherein the fuel is agitated and the grate shaken by causing the bars, or alternate bars, of the series to slide laterally, and is more especially applicable to ranges, stoves, fire-places, and similar grates, where the leverage for imparting motion to the same is necessarily limited. It consists in combining, with a grate composed of parallel sliding bars, a set of deflectors or covering-bars, crossing the ends of the parallel bars in such a manner as to prevent the clogging of the sliding bars, and at the same time permit the free escape of ashes, and entrance of air to promote combustion.

Grates of this general construction have heretofore been employed in large furnaces, the bars weighing upward of a hundred pounds, and of such length that the leverage obtained through the oscillating bar was sufficient to crush clinkers, coals, and other hard substances falling between the ends of the bars and the side walls of the fire-chamber; but, in adapting said grates to use in ranges, stoves, and other like structures where the bar is proportionately short, and its movement more confined, the lightness of the bar and lack of leverage prevent the bar from crushing any obstructing substance which would otherwise stop its movement. To overcome this difficulty is the object of my invention; and, in so doing, I have devised a covering-bar which protects the ends of the series of grate-bars, and is constructed and operated in the manner hereinafter more fully described.

In the drawings referred to, I have represented an ordinary open-grate fire-place, in which A are the walls; B, the grate, constructed of sliding grate-bars having lateral projections, said bars being arranged upon the usual supporting-frame, and operated through the medium of the oscillating lever C by means of the lever C′, or in other suitable manner. D indicates the basket-front, and E the ash-pit, said devices being of the general construction, except in so far as shall be hereinafter specified, where modifications have been made to adapt them for use with my improved devices. E′ represents my improved covering-bar, which may consist of a back plate, *e*, and the projecting curved bars *e′*, corresponding in number, more or less, with the number of bars in the grate; or the curved covering-bar may be a single curved piece or deflector without openings, though preferably made by me with openings, or in the form of curved bars *e′*, as first described, to permit of the passage of ashes and other like material. The back plate *e* projects at both ends beyond the curved deflecting-bar *e′* sufficiently far to enter a slot, *f*, in the rear wall of the fire-place, and at the front to be received under the shoulder *f′* of the basket-front, by which means it is held firmly against the side wall of the fire-place, and in such position that the curved deflecting-bar *e′* shall project over, and within a short distance of, the upper surface of the series of grate-bars, sufficiently close to prevent the entrance of any clinker, large coal, or hard substance, but not sufficiently close to obstruct the passage of any fine ashes that may sift between, or to obstruct the movement of the series of grate-bars. The basket-front D, at either end, is provided with a shoulder, *f*, which comes into position over the flanged end of the covering-bar E, and holds the same in position, the basket-front itself being retained in position by a bolt passing through the frame which supports the grate.

As above set forth, it is evident that the covering-bar need not be slotted or divided into curved bars, as shown, for a solid deflecting-surface projecting down to a point near the upper surface of the grate-bars will serve to protect the end of the bars, and prevent the entrance of obstructing substances; but, for the reasons above mentioned, I prefer the form shown in the drawing.

The operation of the devices is as follows: The grate being shaken or agitated through the means of the lever C′ and oscillating bar C, the grate-bars B will have a lateral movement, either together or alternately, and at which time the opposite ends of the bars will approach or recede from the side walls of the fire-place, and, if unprotected, clinkers or other falling substances would wedge themselves between the ends of the bars, and obstruct the movement of the grate; but the covering-bar or deflector now comes into play to prevent the superimposed mass of coals from falling toward the ends of the bars, so that at no time will the ends of the bars pass beyond the covering-bar, and, as a consequence, no clinkers or obstructing matter can escape beyond the ends of the bar.

Owing to the small size and weight of the bars adapted to and necessarily used in stoves, fire-places, &c., the levers to impart motion to the same being necessarily proportioned to the size of the bar, there would not be sufficient power and strength to crush hard substances, which would tend to clog the movement; consequently, a covering-bar becomes indispensable where grates of the style shown are used or adapted for such small structures.

The covering-bars, being made open in the form of a grate, permit a free and unobstructed flow of air to pass upward through said series of bars or teeth, aiding the perfect combustion of the fuel, and facilitating the grate in freeing itself from ashes when the bars are agitated; and the construction is such that the bars are made removable at pleasure, held in position by the slot in the tile or back wall at the rear end, and by the basket-grate front resting upon them at the front end, which enables them to be removed when the grate is to be removed or replaced, or any of the bars thereof changed.

Having thus described my invention, what I claim, and desire to secure by Letters Patent, is—

1. In combination with a grate composed of parallel sliding bars operated from the front, a set of deflectors or covering-bars arranged across the ends of the parallel sliding bars, and above the frame upon which the bars rest and slide, substantially as and for the purpose specified.

2. In combination with a grate composed of parallel sliding bars, a set of deflectors or covering-bars arranged across the ends of the parallel sliding bars, one or more of the covering-bars being detachable, substantially as and for the purpose specified.

3. In combination with the sliding bars of the grate B, the slotted covering-bar E, secured at the end by the slotted tile and the basket-front, substantially as and for the purpose specified.

In witness whereof I, the said FRANK S. BISSELL, have hereunto set my hand.

FRANK S. BISSELL.

Witnesses:
W. N. PAXTON,
JAMES I. KAY.